(12) United States Patent
Jensen et al.

(10) Patent No.: US 7,344,157 B2
(45) Date of Patent: Mar. 18, 2008

(54) ENERGY ABSORBING SUPPORT FOR A VEHICLE STEERING ASSEMBLY

(75) Inventors: Keith Jensen, Shelby Township, MI (US); Richard Stuedemann, Ortonville, MI (US); William J Elliot, Commerce, MI (US); William A Jolley, West Bloomfield, MI (US); Travis D Bechtel, Goodrich, MI (US)

(73) Assignee: Chrysler LLC, Auburn Hills, MI (US)

( * ) Notice: Subject to any disclaimer, the term of this patent is extended or adjusted under 35 U.S.C. 154(b) by 323 days.

(21) Appl. No.: 11/180,259

(22) Filed: Jul. 13, 2005

(65) Prior Publication Data

US 2007/0013183 A1   Jan. 18, 2007

(51) Int. Cl.
*B62D 1/19*   (2006.01)
(52) U.S. Cl. ..................................... 280/777
(58) Field of Classification Search ............... 280/777, 280/779; 74/492
See application file for complete search history.

(56) References Cited

U.S. PATENT DOCUMENTS 5,803,496 A * 9/1998 Cymbal ...................... 280/777
6,170,873 B1   1/2001 Jurik et al.
6,659,504 B2 * 12/2003 Riefe ......................... 280/777
6,764,098 B2 *  7/2004 Matsumoto et al. ......... 280/777
2003/0042733 A1   3/2003 Riefe

* cited by examiner

*Primary Examiner*—Eric Culbreth
(74) *Attorney, Agent, or Firm*—Ralph E. Smith

(57) ABSTRACT

A vehicle steering assembly with a movable steering column includes a mounting plate carried by the vehicle, a bracket supporting a portion of the steering column, movable with the steering column, and coupled to the mounting plate, a bend mandrel, and a bend strap operably associated with the bracket for movement with the bracket. The bend strap has a pair of legs on opposed sides of the bend mandrel and a bight interconnecting the legs and arranged so that upon movement of the bracket relative to the mounting plate the bend strap engages the bend mandrel and one leg is progressively deformed about the mandrel to absorb energy from the moving bracket and steering column. A portion of the leg progressively deformed about the mandrel upon movement of the bracket engages a reaction surface defined by at least one of the mounting plate or the bracket.

9 Claims, 3 Drawing Sheets

ENERGY ABSORBING SUPPORT FOR A VEHICLE STEERING ASSEMBLY

FIELD OF THE INVENTION

The present invention relates generally to a vehicle steering assembly, and more particularly to an energy absorbing support for a vehicle steering assembly.

BACKGROUND OF THE INVENTION

A steering column of a vehicle typically is secured to the frame of the automobile to ensure safe operation of the automobile. Generally, this is accomplished by bolting the steering column to the instrument panel which may be further secured to the frame of the automobile. However, it can be desirable to allow the steering column to disengage from or move relative to the instrument panel, such as by permitting the steering column to collapse or be displaced, upon the application of a force of sufficient magnitude applied to the steering column, such as may happen during an accident.

Mechanisms to control movement or collapse of the steering column while absorbing energy have been formed out of stamped metal components suitably welded, or otherwise connected together, to form a deformable support system for the steering column and steering wheel. For example, bendable straps of metal have been provided in such a way that they are deformed upon collapsing movement of the steering column. The straps must be engaged with and deformed by or about a suitable surface, and a reaction force must also be accounted for by a suitably strong and durable surface. Typically, the bend/support and reaction surfaces are relatively large and formed separately from the main steering column mounting brackets. This can increase the complexity and cost to manufacture and assemble the steering column assembly, can increase noise from metal-to-metal fittings, and can create design constraints to ensure a suitable strong reaction surface.

SUMMARY OF THE INVENTION

A vehicle steering assembly with a movable steering column includes a mounting plate adapted to be carried by the vehicle, a bracket adapted to support at least a portion of a steering column, and coupled to the mounting plate for movement relative to the mounting plate when a sufficient force is applied to the steering column, a bend mandrel carried by the mounting plate, and a bend strap operably associated with the bracket for movement with the bracket. The bend strap has a pair of legs on opposed sides of the bend mandrel and a bight interconnecting the legs and arranged so that upon movement of the bracket relative to the mounting plate the bend strap engages the bend mandrel and one leg is progressively deformed about the mandrel to absorb energy from the moving bracket and steering column. A portion of the leg progressively deformed about the mandrel upon movement of the bracket engages a reaction surface defined by at least one of the mounting plate or the bracket.

In one presently preferred implementation, the reaction surface is defined by the bracket, and the leg deformed about the bend mandrel slidably engages the reaction surface on the bracket as the bend strap is deformed. In another presently preferred embodiment, the reaction surface is formed in one-piece with the mounting plate, and the bend strap may extend between the reaction surface and the bend mandrel. The bend strap may be resiliently loaded or biased against the reaction surface when the bend strap initially is installed in the steering assembly to eliminate vibration, rattling or other noises, and also to provide a consistent starting load as the bend strap is initially deformed about the mandrel.

BRIEF DESCRIPTION OF THE DRAWINGS

These and other objects, features and advantages of the present invention will be apparent from the following detailed description of the preferred embodiments and best mode, appended claims and accompanying drawings in which:

FIG. 5 is a perspective view of an alternate embodiment steering assembly.

DETAILED DESCRIPTION OF PREFERRED EMBODIMENTS

Figure 1:
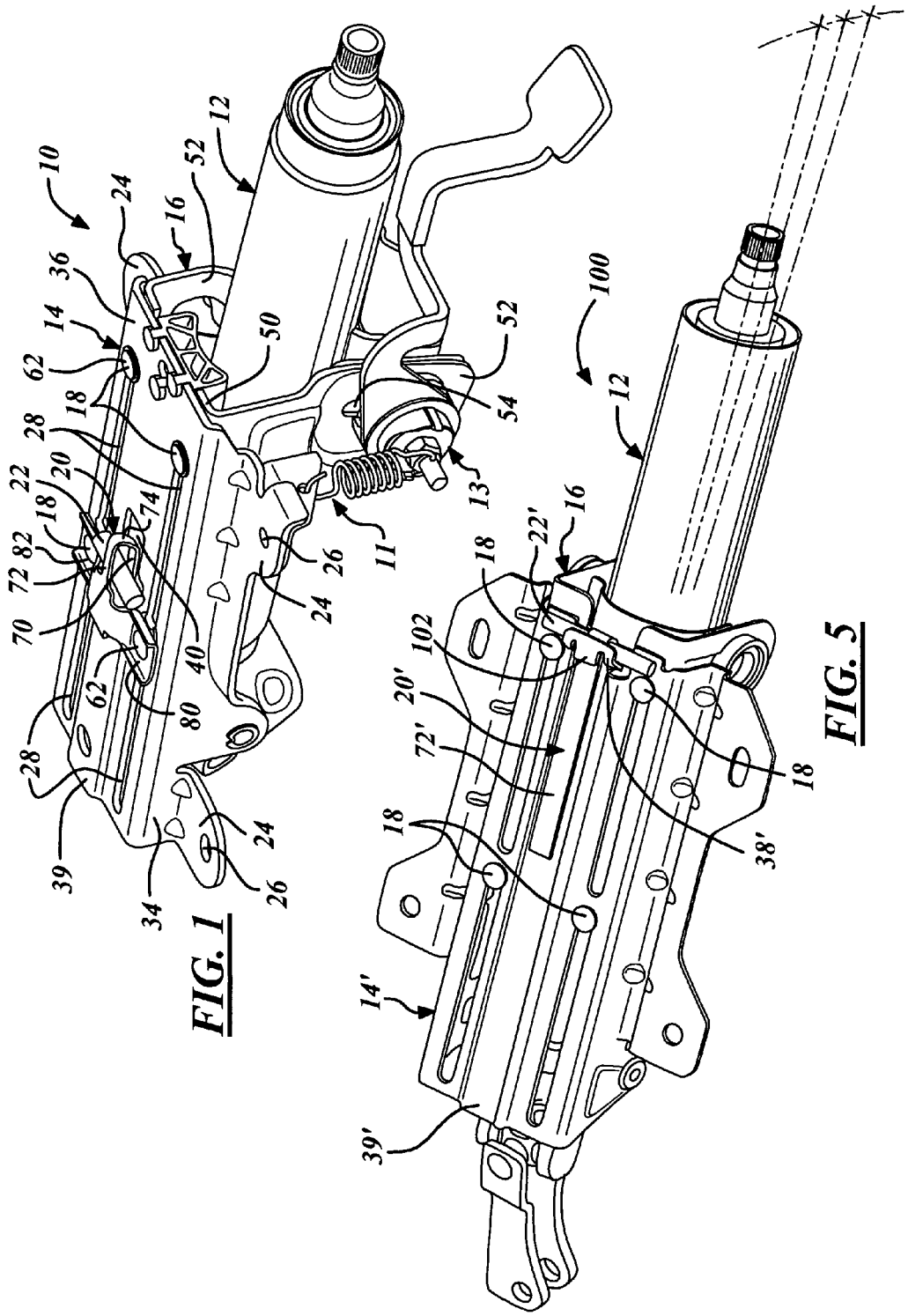
FIG. 1 is a perspective view of one presently preferred embodiment of a portion of a vehicle steering assembly showing a steering column and its support.

Referring in more detail to the drawings, FIG. 1 illustrates a vehicle steering assembly 10 having an energy absorbing support 11 that permits movement of at least a portion of the steering assembly 10 when sufficient force is applied thereto. The steering assembly 10 includes a steering wheel (not shown) connected to a steering column 12 that is carried by the vehicle, preferably with a tilt mechanism 13 so that the angle of the steering column can be adjusted. The steering assembly support 11 includes a mounting plate 14 secured to the vehicle, preferably beneath an instrument panel on the driver side of the vehicle, and a bracket 16 moveably coupled to the mounting plate 14 and adapted to support a portion of the steering column 12. One or more couplers 18 preferably releasably secure the bracket 16 to the mounting plate 14 and permit movement of the bracket 16 relative to the mounting plate 14 when a sufficiently high force is applied to the steering column 12. To absorb some energy from the moving steering column 12 and bracket 16, a bend strap 20 is operably associated with the bracket 16 so that it is deformed about a bend mandrel 22 carried by the mounting plate 14 as the bracket 16 moves relative to the mounting plate 14.

Figure 3:
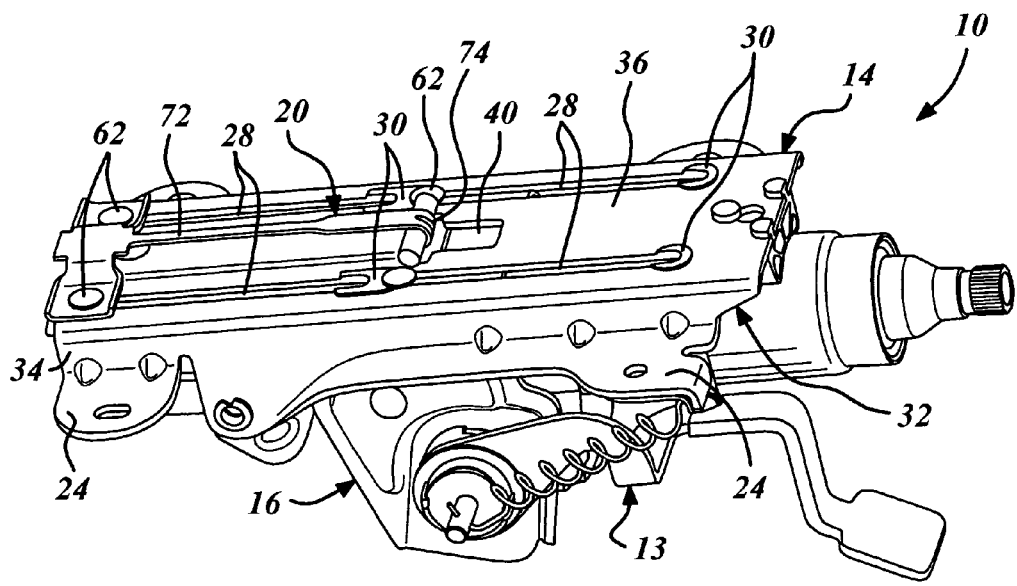
FIG. 3 is a perspective view of a steering assembly shown in a collapsed position.

The mounting plate 14 preferably includes outwardly extending mounting flanges 24 each having one or more openings 26 through which suitable fasteners may be received to attach the mounting plate 14 to a portion of the vehicle, such as an instrument panel of the vehicle. The mounting plate 14 also includes one or more elongated slots 28 that extend generally parallel to the axis of the steering column 12 in assembly. Desirably, at least two parallel and spaced apart slots 28 are provided in the mounting plate 14, and in one presently preferred implementation, four slots 28 are provided with two parallel slots in a rearward portion of the mounting plate 14 and two parallel slots in a forward portion of the mounting plate 14 that preferably are aligned with the slots in the rearward portion of the mounting plate 14. Adjacent a portion of each slot 28, a raised contact surface 30 (FIG. 3) preferably is formed to provide an increased thickness of the mounting plate 14 in the area of the contact surface 30. Desirably, the contact surface 30 adjacent each slot 28 is formed at one end of the slot, such as the rearward ends, as best shown in FIG. 3. Except for the area of the contact surface 30, the thickness of the mounting plate 14 surrounding the periphery of the slots 28 is preferably generally uniform and less than that in the area of the contact surfaces 30.

The mounting plate 14 may include a channel 32 defined by sidewalls 34 disposed between the mounting flanges 24, and a first wall or surface 36 in which the slots 28 are formed. A support surface 38 (FIG. 4) is formed as one-piece with the first surface 36, and is disposed at an angle relative to the first surface 36. The support surface 38 may be formed in any suitable way, such as by bending a portion of the mounting plate as shown in FIG. 5, or by cutting a slot in a raised track 39 as shown in FIGS. 1-4. The support surface preferably is strong and rigid so that it resists significant flexing or deformation under normally encountered loads in use. An opening 40 through the first surface 36 is provided adjacent to the bend mandrel 22 to facilitate attachment of the bend strap 20 to the bracket 16.

The bend mandrel 22 preferably is carried by the mounting plate 14 and abuts the support surface 38 to prevent significant movement of the bend mandrel 22 in the direction of the support surface 38. In one presently preferred implementation, the bend mandrel 22 includes a cylindrical bar that is carried by and may be trapped against or fixed to the mounting plate by any suitable means, such as welding. The bend mandrel 22 could be integral with the mounting plate 14, or provided in other forms or orientations, as desired.

Figure 4:
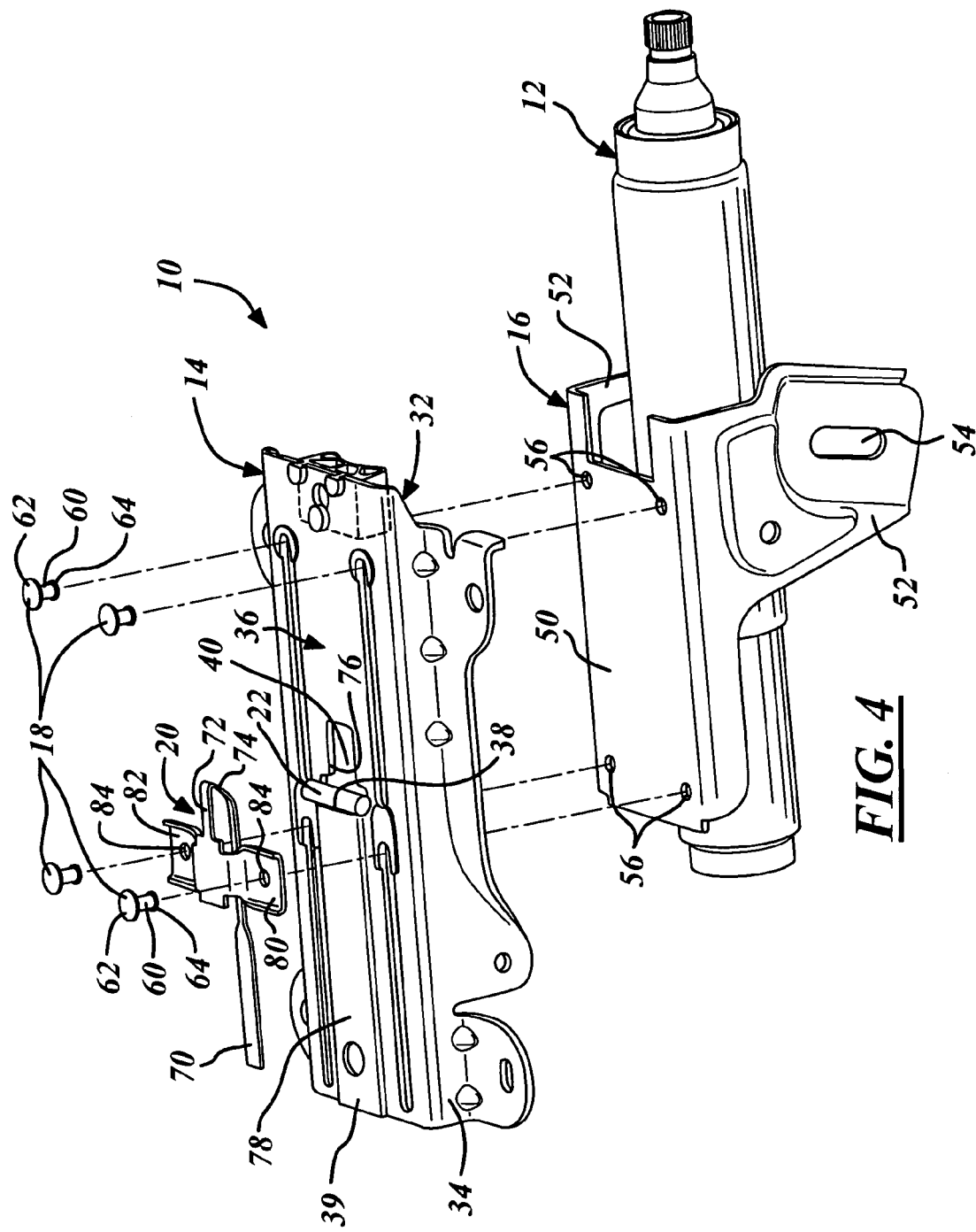
FIG. 4 is an exploded perspective view of some components of the steering assembly.

The bracket 16 may be received generally within the channel 32 of the mounting plate 14 and preferably includes a central portion 50 disposed adjacent to the first surface 36 of the mounting plate 14, and transverse flanges 52 extending away from the mounting plate and including slots 54 through which a rod or fasteners may extend to facilitate coupling the steering column 12 to the bracket 16 in conventional manner. As shown in FIG. 4, a plurality of openings 56 are formed in the bracket 16, and preferably, at least one opening 56 is formed for each of the slots 28 of the mounting plate 14. In assembly, the openings 56 are aligned with respective ones of the slots 28 in the mounting plate 14 so that a fastener or coupler 18 can be inserted through each of the slots 28 and a corresponding opening 56 in the bracket 16.

Each fastener or coupler 18 preferably includes a shank 60 (FIG. 4) that extends through its associated slot 28 and opening 56, an enlarged head 62 that overlies a portion of the mounting plate 14, and a connecting portion 64 that overlies a portion of the bracket 16 to couple the bracket 16 to the mounting plate 14. The coupler 18 may be a rivet wherein the connecting portion 64 is a deformed end of the rivet that is crimped or otherwise engaged with the bracket 16, or a nut and bolt wherein the connecting portion is a nut secured on the bolt and engaging the bracket either directly or through a spacer, washer or the like. Similar spacers, washers or the like may be disposed between the head 62 and the mounting plate 14, if desired. When initially assembled, and throughout normal use of the steering assembly, the head 62 of each coupler 18 overlies and preferably engages a contact surface 30 of the mounting plate 14 and the couplers 18 are installed to provide a clamping force suitable to retain the position of the steering column 12 throughout normal use and driving conditions of the vehicle. Suitable couplers 18 are commercially available from Alcoa under the trade name Huck Lock. The coupler 18 may be a two-piece assembly requiring access to both of its sides, or maybe a blind-type rivet or fastener requiring access to only one side to install and secure the coupler in place.

When a sufficiently high force is applied to the steering column, generally along its axis, the bracket 16, which is generally fixed to the steering column 12, is displaced relative to the mounting plate 14 with the couplers 18 being slidably moved within the slots 28. Once the heads 62 of the couplers 18 clear or slide past the contact surfaces 30, the clamping force holding the bracket 16 to the mounting plate 14 is reduced or substantially relieved since the thickness of all members clamped between the head 62 and connecting portion 64 of the couplers 18 is less when the couplers 18 are not in contact with the contact surfaces 30. Accordingly, energy may initially be absorbed from the collapsing steering column 12 and bracket 16 by way of initially displacing the couplers 18 from the contact surfaces 30.

To provide additional energy absorption, the bend strap 20 is operably associated with the bracket 16 for movement with the bracket 16. The bend strap 20 is preferably a somewhat rigid but flexible metal strap disposed adjacent to and around part of the bend mandrel 22. The bend strap 20 preferably has a pair of legs 70, 72 on opposed sides of the bend mandrel 22 and a bight 74 that interconnects the legs 70, 72 and is arranged to engage the bend mandrel 22 upon movement of the bracket 16 relative to the mounting plate 14. One leg 70 preferably extends in or through the opening 40 in the first surface 36 adjacent to the bend mandrel 22, and may be disposed adjacent to one face 76 (FIG. 4) of the first surface 36 while the other leg 72 is disposed adjacent to an opposite face 78 of the first surface 36. The leg 70 disposed in the opening 40 preferably extends in the track 39 which provides an open space between the mounting plate 14 and the bracket 16. The legs 70, 72 of the bend strap preferably are splayed, such as by about 10 to 30 degrees, so that they are not parallel prior to installation of the bend strap 20. Then, when the bend strap 20 is installed the leg 70 is elastically bent and hence, yieldably biased or resiliently engaged with the bracket 16 to prevent rattling or other noises in use. In this construction, the bracket 16 provides a reaction surface for the leg 70 as the bend strap 20 is deformed about the mandrel 22. More particularly, the reaction force is provided by the central portion 50 of the bracket 16 as the leg 70 slidably engages the central portion 50 during deformation of the bend strap 20. Thus, conveniently, no additional component is needed to provide this reaction surface.

In one presently preferred implementation, the bend strap 20 has a pair of oppositely extending flanges 80, 82 which each have an opening 84 generally aligned with a slot 28 in the mounting plate 14. The couplers 18 that connect the bracket 16 to the mounting plate 14 may extend through the openings 84 to operably connect the bend strap 20 to the bracket 16. In this manner, the bend strap 20 is connected to the bracket 16 at separate points spaced on opposed sides of its legs 70, 72 which may better control movement of the bend strap 20 relative to the bend mandrel 22. Of course, the bend strap 20 could be otherwise arranged and otherwise coupled to the bracket 16, as desired for various applications.

Figure 2:
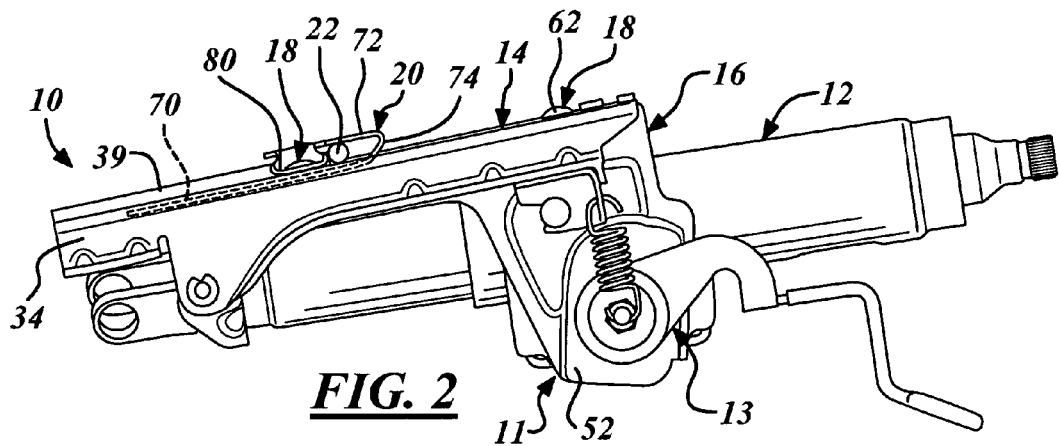
FIG. 2 is a side view of the vehicle steering assembly.

When the bracket 16 is displaced relative to the mounting plate 14, the bend strap 20 is likewise moved relative to the mounting plate 14. When engaged with the bend mandrel 22, continued movement of the bend strap 20 pulls and continually progressively deforms the bend strap 20 about the bend mandrel 22. In this manner, progressive portions of the leg 70 engage the mandrel 22 and define the bight 74, with a portion of the bend strap 20 that previously formed the bight 74 being moved away from the mandrel 22 and forming part of the leg 72. Thus, energy from the collapsing steering column 12 and bracket 16 is absorbed or transferred to the bend strap 20. The bend strap 20 may be arranged so that it abuts the bend mandrel 22 in initial assembly before any collapse of the steering column 12, or the bend strap 20 may initially be spaced from the bend mandrel 22 (as best shown in FIG. 2), if desired. For example, the bend strap 20 could be spaced form the bend mandrel 22 a distance approximately equal to the linear distance that the bracket 16 must move relative to the mounting plate 14 so that the heads 62 of the couplers 18 clear the contact surfaces 30. In this way, the bend strap 20 will not begin to resist displacement of the collapsing steering column 12 until after the couplers 18 are displaced from the contact surfaces 30.

The thickness and width of the bend strap 20 may vary along its length, or from one application to another, to vary the energy required to deform it. In one presently preferred embodiment the bend strap 20 is used with an 8 mm diameter bend mandrel 22 and is between about 1.4 to 2.5 mm thick, more preferably about 1.75 mm thick, and is formed of a metal having a yield strength of about 50 ksi. As best shown in FIG. 3, the bend strap width preferably is varied so that the force required to bend the strap 20 varies by two to three-fold along the length of the strap 20. In other words, the force to bend the strongest portion of the strap 20 is 2 to 3 times greater than the force to bend the weakest portion of the strap 20. Initial loading of the bend strap 20 on the mandrel 22 can also be controlled, as desired. For example, with an 8 mm diameter bend mandrel 22, the bight 74 of the bend strap 20 could be formed with a bend radius of 6 mm, as best shown in FIGS. 1 and 2. Upon initial engagement with the bend mandrel 22, the bight 74 is spread about the mandrel 22, consuming a desired amount of energy before continued deformation of the bend strap 20. Of course, other configurations, contours, shapes and sizes of the bend strap 20 may be employed to facilitate a desired amount, timing and/or rate of energy absorption.

In an alternate embodiment steering assembly 100 shown in FIG. 5, the support surface 38', is integral with the mounting plate 14', extends upwardly above the bend mandrel 22' and includes a tab 102. A leg 72' of the bend strap 20' extends over the mandrel 22' and beneath the tab 102. The other leg (not shown) of the bend strap 20' is fixed to the bracket 16 such as by welding or a suitable fastener. As the bracket 16 moves relative to the mounting plate 14, the bend strap 20' moves relative to the mounting plate 14 and is deformed about the mandrel 22' with the leg 72' progressively pulled between the mounting plate 14' and the bracket 16. In this embodiment, the tab 102 provides the reaction surface for the leg 72' of the bend strap 20. So, in each embodiment the reaction surface for the bend strap 20, 20' is integrated into or provided by existing parts of the assembly 10. The remainder of this embodiment steering assembly 100 can be constructed similarly to the first described assembly 10 and hence, will not be further described.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. Of course, still other modifications and substitutions can be made. The invention is defined by the following claims.

What is claimed is:

1. A vehicle steering assembly with a movable steering column, including:
   a mounting plate adapted to be carried by the vehicle;
   a bracket adapted to support at least a portion of a steering column, and coupled to the mounting plate for movement relative to the mounting plate when a sufficient force is applied to the steering column;
   a bend mandrel carried by the mounting plate; and
   a bend strap operably associated with the bracket for movement with the bracket and including a pair of legs on opposed sides of the bend mandrel and a bight interconnecting the legs and arranged so that upon movement of the bracket relative to the mounting plate the bend strap engages the bend mandrel and one leg is progressively deformed about the mandrel to absorb energy from the moving bracket and steering column, and a portion of the leg progressively deformed about the mandrel upon movement of the bracket engages a reaction surface defined by at least one of the mounting plate or the bracket, wherein at least one of the bracket or the mounting plate includes a track defining a space between the bracket and mounting plate in which a portion of the leg progressively deformed about the mandrel is received.

2. The assembly of claim 1 wherein the leg progressively deformed about the mandrel has at least a portion disposed between the bracket and the mounting plate.

3. The assembly of claim 2 which also includes an opening in the mounting plate through which a portion of the bend strap is received.

4. The assembly of claim 1 wherein the leg progressively deformed about the mandrel slidably engages the bracket as that leg is deformed about the mandrel.

5. A vehicle steering assembly with a movable steering column, including:
   a mounting plate adapted to be carried by the vehicle;
   a bracket adapted to support at least a portion of a steering column, and coupled to the mounting plate for movement relative to the mounting plate when a sufficient force is applied to the steering column;
   a bend mandrel carried by the mounting plate; and
   a bend strap operably associated with the bracket for movement with the bracket and including a pair of legs on opposed sides of the bend mandrel and a bright interconnecting the legs and arranged so that upon movement of the bracket relative to the mounting plate the bend strap engages the bend mandrel and one leg is progressively deformed about the mandrel to absorb energy from the moving bracket and steering column, and a portion of the leg progressively deformed about the mandrel upon movement of the bracket engages a reaction surface defined by at least one of the mounting plate or the bracket, wherein the leg progressively deformed about the mandrel is disposed between a reaction surface carried by the mounting plate and the bend mandrel.

6. The assembly of claim 5 wherein the reaction surface is formed in one-piece with the mounting plate.

7. The assembly of claim 6 wherein the reaction surface is defined by a flange extending from the mounting plate, an opening is defined between the flange and the bend mandrel, and the bend strap is received through the opening.

8. The assembly of claim 7 wherein the flange includes a tab extending generally parallel to an adjacent portion of the bend strap and adapted to be engaged by the bend strap to provide the reaction surface.

9. A vehicle steering assembly with a movable steering column, including:
- a mounting plate adapted to be carried by the vehicle;
- a bracket adapted to support at least a portion of a steering column, and coupled to the mounting plate for movement relative to the mounting plate when a sufficient force is applied to the steering column;
- a bend mandrel carried by the mounting plate; and a bend strap operably associated with the bracket for movement with the bracket and including a pair of legs on opposed sides of the bend mandrel and a bight interconnecting the legs and arranged so that upon movement of the bracket relative to the mounting plate the bend strap engages the bend mandrel and one leg is progressively deformed about the mandrel to absorb energy from the moving bracket and steering column, and a portion of the leg progressively deformed about the mandrel upon movement of the bracket engages a reaction surface defined by at least one of the mounting plate or the bracket, wherein the leg progressively deformed about the bend mandrel is yieldably biased into engagement with the reaction surface.

* * * * *